United States Patent
Ziegler et al.

(10) Patent No.: US 12,113,477 B1
(45) Date of Patent: Oct. 8, 2024

(54) BUFFERING IN PHOTOVOLTAIC PLUS STORAGE SYSTEMS

(71) Applicant: TelemeTrak, Inc., Oakland, CA (US)

(72) Inventors: Frederick Steinway Ziegler, San Francisco, CA (US); Bjorn-Erik Eklund, San Francisco, CA (US)

(73) Assignee: TelemeTrak, Inc., Oakland, CA (US)

( * ) Notice: Subject to any disclaimer, the term of this patent is extended or adjusted under 35 U.S.C. 154(b) by 8 days.

(21) Appl. No.: 18/112,287

(22) Filed: Feb. 21, 2023

Related U.S. Application Data

(60) Provisional application No. 63/312,357, filed on Feb. 21, 2022.

(51) Int. Cl.
| | |
|---|---|
| H02S 40/38 | (2014.01) |
| H02J 7/34 | (2006.01) |
| H02J 7/35 | (2006.01) |
| H02J 15/00 | (2006.01) |

(52) U.S. Cl.
CPC .............. *H02S 40/38* (2014.12); *H02J 7/345* (2013.01); *H02J 7/35* (2013.01); *H02J 15/003* (2013.01); *H02J 15/007* (2020.01); *H02J 2207/50* (2020.01)

(58) Field of Classification Search
CPC .................................. H02S 40/38; H02S 10/20
See application file for complete search history.

(56) References Cited

U.S. PATENT DOCUMENTS

| | | | |
|---|---|---|---|
| 2008/0224652 A1* | 9/2008 | Zhu .................... | H02S 40/38 320/148 |
| 2012/0219829 A1* | 8/2012 | Shimura ............ | H01M 16/006 429/7 |
| 2013/0266826 A1* | 10/2013 | Cowperthwaite ... | H01M 50/209 29/25.42 |
| 2014/0339898 A1* | 11/2014 | Mueller ................ | H02M 3/158 307/43 |
| 2016/0295334 A1* | 10/2016 | Cherigui ................... | G06F 1/24 |
| 2017/0155277 A1* | 6/2017 | Ohkanda .............. | H02J 7/00711 |
| 2017/0237282 A1* | 8/2017 | Huang .................... | H02J 7/345 307/48 |
| 2018/0254732 A1* | 9/2018 | Smolenaers .............. | H02J 1/12 |
| 2018/0351015 A1* | 12/2018 | Hopf ................. | H01L 31/02021 |
| 2020/0169108 A1* | 5/2020 | Maji ................. | H02J 7/007194 |
| 2020/0227922 A1* | 7/2020 | Bae ...................... | H02S 40/32 |
| 2021/0021143 A1* | 1/2021 | Maji ..................... | H05B 45/10 |
| 2022/0075015 A1* | 3/2022 | Twieg ................ | G01R 33/3852 |

* cited by examiner

*Primary Examiner* — Adi Amrany
(74) *Attorney, Agent, or Firm* — The Law Office of Raul D. Martinez, PC

(57) ABSTRACT

The devices, systems, and methods described herein are directed to buffering the electrical energy output from a PV array before storing the electrical energy in a battery storage system of the PV system. In some examples, a buffering module receives electrical energy from one or more PV cells at a first level that exceeds a threshold charging rate of a battery storage system. The buffering module temporarily stores the electrical energy before outputting the electrical energy to the battery storage system at a second level that is at or below the threshold charging rate of the battery storage system.

10 Claims, 2 Drawing Sheets

__BUFFERING IN PHOTOVOLTAIC PLUS STORAGE SYSTEMS__

CLAIM OF PRIORITY

The present application claims priority to U.S. Patent Application No. 63/312,357, entitled "BUFFERING IN PHOTOVOLTAIC PLUS STORAGE SYSTEMS" and filed Feb. 21, 2022, which is assigned to the assignee hereof and hereby expressly incorporated by reference in its entirety.

STATEMENT REGARDING FEDERALLY SPONSORED RESEARCH OR DEVELOPMENT

This invention was made with government support under Award No. DE-SC0022722 awarded by the U.S. Department of Energy. The government has certain rights in the invention.

FIELD

The subject matter described herein relates to devices, systems, and methods for harvesting energy from intermittent energy sources and more particularly to buffering electrical energy in photovoltaic systems.

BACKGROUND

Photovoltaic systems use a photovoltaic array (e.g., solar panels) to convert sunlight into electrical energy that can be stored for later use.

Renewable energy sources, such as solar panels and wind turbines, are oftentimes intermittent and do not provide a consistent, constant source of energy that can be predictably harvested. One example of an intermittent, renewable energy source is sunlight, which can be converted into electrical energy by photovoltaic (PV) systems to produce copious amounts of power at times but very little power just a few seconds later. More specifically, PV power is only stable on bright, sunny days without any cloud cover. However, PV power is generally very bursty and can vary by a factor of four (e.g., 4x) to ten (e.g., 10x) on partially cloudy days. In PV systems, the power that is produced from a PV array is stored in an energy storage system for consumption at a later point in time.

Traditional residential scale PV systems store energy in batteries. However, there is a limit to how quickly batteries can be charged. For example, it takes at least an hour to charge a lithium-ion (Li-ion) battery energy storage system (BESS) to full capacity. It can take four or more hours to charge a lead-acid battery to full capacity. The Department of Energy National Renewable Energy Laboratory (NREL) U.S. Solar Photovoltaic System and Energy Storage Cost Benchmarks: Q1 2021 report (page 6, Table ES-2. "Q1 2021 PV and Energy Storage Cost Benchmarks") shows much longer charging times: 2.5 hours for Residential-Scale Li-ion BESS, and 4 hours for Commercial- and Utility-Scale Li-ion BESS.

These charging times assume a maximum charging rate that will not damage the battery or substantially reduce its coulombic efficiency (CE). The CE describes the charge efficiency by which electrons are transferred in batteries. CE is generally expressed as the ratio of the total charge extracted from the battery to the total charge put into the battery over a full cycle.

In cases of bursty PV power, many existing battery storage solutions are inadequate because of the limitations of how quickly the batteries can be charged (e.g., charging rate). In order to protect the BESS from damage, degraded efficiency, or a reduced life cycle, these systems are generally designed to "clip" or "curtail" (e.g., waste) any power that is generated by the PV array at a rate that exceeds the charging rate of the batteries of the BESS. The average household requires 48 kWh of energy each day, which is ideally generated and stored by the PV system each day. Any energy that is clipped does not contribute to the energy that can be used and/or stored by the PV system.

Energy clipping occurs when the solar energy inflow exceeds the charging rate of the battery. Any energy that is not stored in the battery or otherwise consumed the instant it is available is lost, or "clipped." For example, when an appliance is plugged into a power outlet, the appliance only consumes the power it requires (e.g., 45 watts for a 45 watt light bulb), whereas the wall outlet can normally output many times that power. Clipping is minimal during a sunny day, such as observed in Savannah, Georgia on Dec. 8, 1986, which is supported by NREL historical data. On such a day, the inflow of energy is fairly constant, with a maximum of 615 W/m$^2$, and the battery will receive a constant rate of charging. However, clipping is substantial on a day when clouds alternately hide and reveal the sun (e.g., "checkerboard clouds"), such as observed in Savannah, Georgia on the previous day, Dec. 7, 1986, which is also supported by NREL historical data. In this case, the solar energy inflow swings dramatically between 115 W/m$^2$ and 590 W/m$^2$ during the five hours in the middle of the day. The total solar energy available on this day was 66% of the energy available on the following, sunny day. If a battery that can accept the maximum solar energy inflow were to be used, then this capability is wasted during the dips. Alternatively, if a battery that can only accept less than the maximum energy inflows were to be used, then some of the incoming power is lost ("clipped"). In this example, a battery chosen to always be charging at the minimum solar energy inflow rate (e.g., 115 W/m$^2$) for the five hour period on the cloudy day would only capture 24% of the incoming solar energy. If a solar power charging system for a given location is to power a home on all days, then it should be designed for checkerboard clouds days, as opposed to sunny days, as there is less solar power available on the checkerboard clouds days.

One approach to store all of the solar energy produced by the PV panels of a PV system includes increasing the size of the BESS to make its power capacity sufficient for peak solar power output from the larger PV array. However, increasing the size of the BESS increases system inefficiencies. For example, increasing the size of the BESS increases the amount of energy lost when the system "clips" or "curtails" the power that is generated by the PV array at a rate that exceeds the charging rate of the batteries of the BESS. In addition, increasing the size of the BESS creates a scenario in which the system has a greater BESS energy storage capacity than needed. More specifically, when a larger BESS is used for its higher power capacity, multiple batteries of the BESS are generally charged in parallel to capture more energy and reduce waste, but in these scenarios none of the batteries gets fully charged. Thus, increasing the size of the BESS can result in a BESS that is rarely fully charged, which increases the cost and inefficiency of the system.

SUMMARY

The devices, systems, and methods described herein are directed to buffering the electrical energy output from a PV array before storing the electrical energy in a battery storage system of the PV system. In some examples, a buffering module receives electrical energy from one or more PV cells at a first level that exceeds a threshold charging rate of a battery storage system. The buffering module temporarily stores the electrical energy before outputting the electrical energy to the battery storage system at a second level that is at or below the threshold charging rate of the battery storage system.

DETAILED DESCRIPTION

Figure 1:
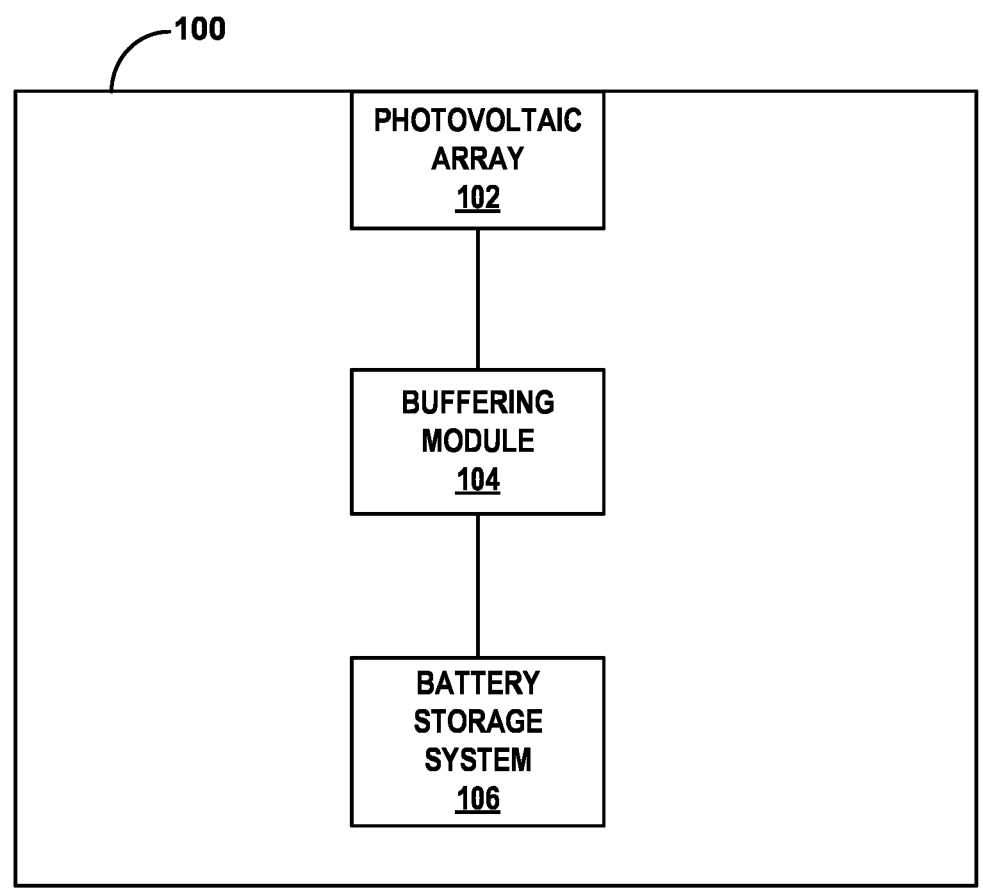
FIG. 1 is a block diagram of an example of a photovoltaic (PV) system comprising a buffering module.

As described below, the electrical energy produced by a PV array can be buffered in order to smooth out the bursty nature of the PV power so that all of the electrical energy can eventually be stored in the BESS without increasing the size or storage capacity of the BESS. The devices, systems, and methods described herein minimize the waste and inefficiencies of conventional PV systems by buffering the electrical energy from the PV array before storing the electrical energy in the BESS. In some examples, the hardware and software utilized to buffer the electrical energy reduces the number of PV panels needed in the PV array and reduces the number and size of batteries needed in the BESS, especially in changing weather conditions that are typically found in most locations.

Although the following examples are described within the context of PV systems, the buffering concepts and devices can be applied within any other system that harvests energy from an intermittent power source. As used herein, a PV system generally utilizes a PV array comprising one or more PV cells to convert sunlight incident on the PV array into electrical energy. The terms "PV array," "PV panels," and "PV modules" may be interchangeably used herein.

In some examples, supercapacitors are used in a buffering module to buffer electrical energy when the PV array (e.g., solar panels) are generating power faster than the batteries can store it. The inclusion of the buffering module in the PV system (1) reduces waste, (2) reduces the size of the PV array required to generate a desired amount of electrical energy, and (3) reduces the number and size of the batteries required in the BESS. By reducing all of these inefficiencies, the levelized cost of energy (LCOE) of the PV system is also reduced, allowing the generation of more PV electrical energy at a lower cost per unit of energy.

As used herein, the LCOE is a measure of the average net present cost of electrical energy generation for a PV system over its lifetime. The LCOE represents the average revenue per unit of electrical energy generated that would be required to recover the costs of building and operating a PV system during an assumed financial life and duty cycle of the PV system. The LCOE is calculated as the ratio between all the discounted costs over the lifetime of the PV system divided by a discounted sum of the actual energy amounts delivered.

As mentioned above, clouds can reduce the electrical energy output of PV panels by 4× to 10× (e.g., 75% to 90%). Thus, larger PV modules are needed to meet PV energy production targets in cloudy conditions. With larger modules and PV power bursting by 4× to 10× every time the sun appears from behind a cloud, the rate at which electrical energy is output from the PV panels can suddenly exceed the rate at which the batteries of the BESS can be charged.

However, buffering can reduce the waste associated with clipping or discarding the excess electrical energy by allowing the harvesting of that excess electrical energy. Buffering also reduces stress on the BESS by supplying the electrical energy to the BESS at a safe rate at a later point in time (e.g., when a cloud blocks the sunlight and the electrical energy output from the PV array decreases). The buffering modules described herein, whether integrated into new PV systems or retrofitted into previously installed PV systems, improve the affordability, reliability, and efficiency of solar technologies. In some examples, the PV system utilizes commercially available energy storage (e.g., batteries) and PV panels.

Following is an example that demonstrates the effectiveness and the cost savings associated with buffering the electrical energy before charging the BESS in a PV system. Consider a stand-alone (e.g., not connected to the electrical grid) PV Plus Storage system designed to harvest 30 kWh of PV electrical energy per day, which is the average that residential customers in the United States purchased in 2019. To generate 30 kWh of energy each day, a larger PV array is needed in cloudy conditions than under clear skies. For example, the size of PV panels operating in 67% cloud cover would need to be scaled up by 124% to meet the 30 kWh daily energy capture requirement (assuming an average 82.5% reduction in PV power under clouds, which is the average of the 75% and 90% output reductions described above).

Photovoltaic module and battery costs represent 45% of the cost of co-located PV Plus Storage systems. In some examples, using a supercapacitor buffering module within a PV system can reduce total hardware costs by over 15%, including the cost of the supercapacitor buffering module, which can replace some batteries and controllers.

In our testing, the cost reductions associated with buffering when compared to adding Li-ion BESS capacity increase roughly linearly with added cloud coverage. For example, buffering would save approximately 16% of the NREL benchmark storage system cost under 67% cloud coverage, which is the average cloud coverage in the United States. The cost savings increases in cloudier conditions/locations.

In some examples, the buffering modules described herein use one or more of the following as buffers: a capacitor, a supercapacitor, a flywheel energy storage system (FESS), pumped storage hydropower (PSH), and a nickel-cadmium (NiCd) energy buffering stage. Supercapacitor, flywheel, and PSH buffering can all reduce the levelized costs of PV Plus Storage systems. Regardless of the type of buffer used in the buffering module, the buffering modules are generally configured to temporarily store electrical energy for less than an hour before providing the electrical energy to the BESS, in some examples.

Supercapacitors generally appear to be the most cost-effective. Supercapacitors also charge nearly instantaneously, with very little power wasted. In contrast, charging batteries takes longer and wastes power from chemical reactions producing heat. Efficiencies achieved by buffering energy in supercapacitors permit smaller and cheaper combinations of renewable energy sources (e.g., solar panels or wind turbines) and batteries to produce and store more energy.

In some examples, lower cost flywheels (e.g., even some made of concrete) can be used for residential applications (e.g., housed in an air-tight enclosure, typically buried in the backyard, for safety in case of a mechanical failure) that offer lower costs. PSH buffering can be the most cost-effective in some cases, for example, if a house with a stand-alone (off-the-grid) PV Plus Storage system is built on a sloped piece of land, where it would be relatively inexpensive to install a PSH water reservoir either up- or down-hill from the house, on the ground, with no need to build a structure to elevate the water reservoir.

In some of these examples in which a supercapacitor is used as the buffer, a 15 W PV system can operate with 90% less lead-acid battery energy capacity in conditions with very bursty power. After including the added cost of the buffering module, the full PV system cost is 60% lower than without buffering. These results of efficiency and cost-savings can be scaled up to residential-level (5 KW) PV Plus Storage systems, and even further to commercial or industrial applications.

As shown in FIG. 1, the buffering module operates between the PV array of a PV system and the battery storage system, to buffer PV power when it is generated faster than the batteries can store the energy produced. In some examples, the buffering module then feeds the buffered energy into the batteries at their optimal charging rate. This configuration works particularly well in variable weather, when PV panels are intermittently in the shade, partly or fully.

By providing electrical energy to the batteries at a consistent level (e.g., rate) that accommodates the optimal charging rate of the batteries, the buffering module can reduce the required battery storage capacity and overall system costs. Such a configuration also dramatically reduces the waste of energy that is generated above the optimal battery charging rate. An additional benefit of buffering is that leveling out bursts of power by buffering extends the life of the BESS and thus reduces life cycle costs. More specifically, fast charging and heavy loading contribute to battery strain, which reduces battery life cycle and increases the total cost of ownership, while also reducing the battery's energy efficiency.

In most cases, Li-ion BESS makes the most sense for residential scale PV Plus Storage systems. Potential savings are even greater with lead-acid BESS. Lead-acid BESS are currently used less often than Li-ion BESS, but lead-acid BESS may become necessary in the future since lithium carbonate prices have recently increased by 1130%, which is a trend that seems likely to continue. Thus, it is possible that lithium shortages will make Li-ion BESS prohibitively expensive for residential PV Plus Storage systems. Fortunately, buffering can greatly reduce the cost of lead-acid BESS and thus support the continued rapid pace of PV system deployments.

Supercapacitor buffering can lower the levelized cost of a residential PV Plus Storage system's Li-ion BESS by 26% (e.g., by reducing the number of Li-ion batteries required in the BESS), including the cost of the supercapacitors. The savings would be much larger if Li-ion battery prices continue to climb. If lead-acid batteries are used in the BESS instead of Li-ion, the savings almost triple.

The devices, systems, and methods described herein are directed to buffering the electrical energy output from a PV array before storing the electrical energy in a battery storage system of the PV system. In some examples, a buffering module receives electrical energy from one or more PV cells at a first level that exceeds a threshold charging rate of a battery storage system. The buffering module temporarily stores the electrical energy before outputting the electrical energy to the battery storage system at a second level that is at or below the threshold charging rate of the battery storage system.

Although the different examples of devices, systems, and methods of buffering in PV systems may be described herein separately, any of the features of any of the examples may be added to, omitted from, or combined with any other example.

FIG. 1 is a block diagram of an example of a photovoltaic (PV) system comprising a buffering module. PV system 100 comprises photovoltaic (PV) array 102, buffering module 104, and battery storage system 106. PV array 102 comprises one or more PV cells to convert sunlight incident on PV array 102 into electrical energy. The term "PV panels" may also be interchangeably used herein to refer to a PV array since the PV array is comprised of one or more PV panels, each of which is comprised of one or more PV cells.

Buffering module 104 is electrically coupled to the one or more PV cells of PV array 102. Buffering module 104 comprises an input to receive electrical energy from the one or more PV cells at a first level (e.g., rate) that exceeds a threshold charging rate of battery storage system 106. Buffering module 104 also comprises a buffer electrically coupled to the input. The buffer is configured to temporarily store the electrical energy received from the one or more PV cells. Buffering module 104 further comprises an output electrically coupled to the buffer. The output is configured to provide electrical energy to battery storage system 106 at a second level (e.g., rate) that is at or below the threshold charging rate of the battery storage system.

In some examples, the threshold charging rate of battery storage system 106 is a maximum charging rate of battery storage system 106. In other examples, the threshold charging rate of battery storage system 106 is an optimized charging rate of battery storage system 106. More specifically, in some examples, the optimized charging rate may be a pre-configured percentage (e.g., 80%) of the maximum charging rate of battery storage system 106. In still further examples, the optimized charging rate may be set by the user to a predetermined level, to vary on a preset schedule, or to automatically vary with predicted or current cloud cover conditions.

In the example shown in FIG. 1, the buffer of buffering module 104 is a supercapacitor. In other examples, the buffer can be one or more of the following: a capacitor, a supercapacitor, a flywheel energy storage system (FESS), pumped storage hydropower (PSH), and a nickel-cadmium (NiCd) energy buffering stage.

In some examples, battery storage system 106 is comprised of one or more of the following a Li-ion battery and a lead-acid battery. In other examples, any other suitable energy storage solution may be used.

Although not explicitly shown in FIG. 1, PV system 100 may have additional components and functionality, in some examples. For example, PV system 100 may include a processor configured to track and report system status and performance, facilitate remote configuration of system settings, and to optimize the PV system for local conditions and user needs. As used herein, a processor includes any combination of hardware, software, and/or firmware for executing the functions described herein as well as facilitating the overall functionality of PV system 100. In some examples, a processor may be a microprocessor or processor arrangement (e.g., on which code is running) connected to memory (not shown in FIG. 1). In the examples that include a processor, the processor is communicatively coupled to other system components so that the processor can receive signals from and send signals to other system components in order to carry out the required system functionality.

In operation, PV system 100 monitors voltage coming from PV array 102, which is used to charge batteries and run system electronics. When excess power is available, as evidenced by healthy incoming voltages, PV system 102 begins charging the buffer of buffering module 104 while still monitoring input voltages. If the voltage from PV array 102 drops off (e.g., decreases), PV system 100 stops charging the buffer but still provides power to run the system electronics and charge the batteries within battery storage system 106. If there is not enough power coming from PV array 102 to charge the batteries within battery storage system 106 and to run the system electronics, the buffer provides power until the buffer charge is depleted. Once the incoming power from PV array 102 is not sufficient and the buffer is depleted, the batteries of battery storage system 106 begin powering the system.

In further examples not explicitly shown in FIG. 1, PV system 100 may additionally include one or more of the following: remote environmental sensors, system electronics, cloud-based data collection and monitoring interfaces, and a user communication interface. For example, remote environmental sensors may be utilized to gather information regarding predicted and/or observed cloud cover conditions, which can be utilized to determine whether to charge the buffer or the batteries with the electrical energy received from PV array 102. The user communication interface may be a wired or wireless communication interface that allows users to receive status reports/updates regarding system performance, production, etc. The user communication interface may also enable a user to set or modify the threshold charging rate of battery storage system 106, in some examples.

Although the foregoing examples involve a stand-alone PV system that is not connected to an electrical grid, PV system 100 may further include components to enable the transfer of electrical energy to/from an electrical grid, in some examples. For example, battery storage system 106 may be electrically coupled to an electrical grid to receive electrical energy from or provide electrical energy to the electrical grid. In further examples, a user may input a command via a user communication interface of PV system 100, instructing PV system 100 to provide electrical energy to the electrical grid. The command may, in some examples, be conditioned upon a threshold rate of electrical energy being output from PV array 102 and/or upon battery storage system 106 achieving a threshold level of charge. In other examples, the command may be conditioned on a reimbursement rate offered by the operator of the electrical grid for providing electrical energy to the electrical grid at certain days/times.

In still further examples, a maximum power point tracking (MPPT) solution (e.g., algorithm) may be used in combination with a PV Plus Storage system. The MPPT alternates between reducing and increasing the current flow from the PV array by a small amount and calculates the power being produced by multiplying the voltage and current together (e.g., power=voltage×current). Thus, the MPPT continuously "walks" the PV system up and down the power curve, oscillating around the peak power point. If clouds cover the sun, the MPPT voltage may change, and then a processor of the PV system performs this "walking" algorithm to adjust the current, accordingly. Thus, the MPPT continuously oscillates to the left and right of the peak of the power curve.

By monitoring voltage and current consumption in real-time, the PV system can utilize the MPPT algorithm to throttle the charge rate as necessary and optimize efficiency by making the best use of the PV array, buffering module, and battery storage system. This optimization can also extend battery life, which further reduces total, lifetime system costs.

The MPPT solution works with nearly any solar panel, requires less configuration, eliminates the need to stop the current flow from the solar panel in order to check its no-load voltage, and takes into account that the MPPT voltage can change in lower light conditions.

Figure 2:
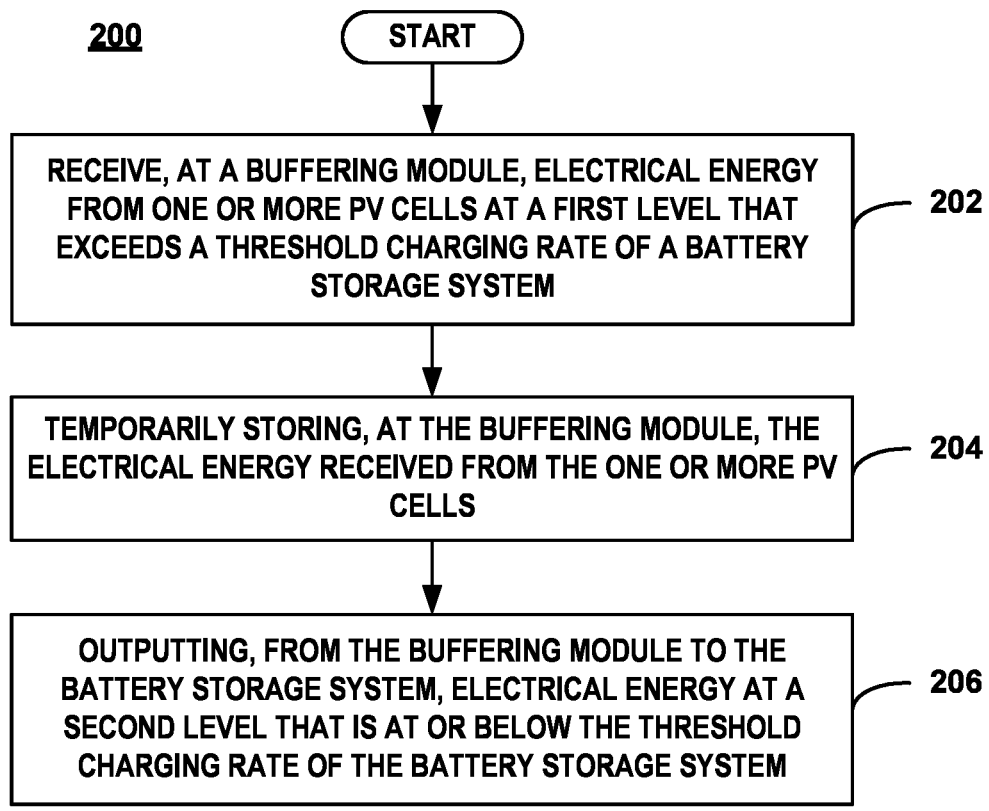
FIG. 2 is a flowchart of an example of a method of buffering electrical energy in a photovoltaic (PV) system.

FIG. 2 is a flowchart of an example of a method of buffering electrical energy in a photovoltaic (PV) system. The method 200 begins at step 202 with receiving, at a buffering module, electrical energy from one or more PV cells at a first level that exceeds a threshold charging rate of a battery storage system. At step 204, the electrical energy received from the one or more PV cells is temporarily stored at the buffering module. At step 206, the electrical energy is output from the buffering module to the battery storage system at a second level that is at or below the threshold charging rate of the battery storage system. In other examples, one or more of the steps of method 200 may be omitted, combined, performed in parallel, or performed in a different order than that described herein or shown in FIG. 2. In still further examples, additional steps may be added to method 200 that are not explicitly described in connection with the example shown in FIG. 2.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. A photovoltaic (PV) system comprising:
    a PV array comprising one or more PV cells to output electrical energy at a first level that exceeds a threshold charging rate of a battery storage system;
    the battery storage system; and
    a buffering module directly coupled to the one or more PV cells, the buffering module comprising:
        an input to receive the electrical energy from the one or more PV cells,
        a buffer electrically coupled to the input, the buffer to temporarily store the electrical energy received from the one or more PV cells, and
        an output electrically coupled to the buffer, the output to provide electrical energy to the battery storage system at a second level that is at or below the threshold charging rate of the battery storage system.

2. The PV system of claim 1, wherein the threshold charging rate of the battery storage system is a maximum charging rate of the battery storage system.

3. The PV system of claim 1, wherein the threshold charging rate of the battery storage system is an optimized charging rate of the battery storage system.

4. The PV system of claim 1, wherein the buffer is a capacitor.

5. The PV system of claim 4, wherein the buffer is a supercapacitor.

6. The PV system of claim 1, wherein the buffer is a flywheel.

7. The PV system of claim 1, wherein the buffer is a pumped storage hydropower (PSH) system.

8. A method of buffering electrical energy in a photovoltaic (PV) system, the method comprising:
- outputting, from one or more PV cells of a PV array, electrical energy at a first level that exceeds a threshold charging rate of a battery storage system;
- receiving at a buffering module, the electrical energy from the one or more PV cells at the first level;
- temporarily storing, at the buffering module, the electrical energy received from the one or more PV cells; and
- outputting, from the buffering module to the battery storage system, electrical energy at a second level that is at or below the threshold charging rate of the battery storage system.

9. The method of claim 8, wherein the threshold charging rate of the battery storage system is a maximum charging rate of the battery storage system.

10. The method of claim 8, wherein the threshold charging rate of the battery storage system is an optimized charging rate of the battery storage system.

\* \* \* \* \*